US012120782B2

(12) United States Patent
Matsushita

(10) Patent No.: US 12,120,782 B2
(45) Date of Patent: Oct. 15, 2024

(54) CERAMIC HEATER AND METHOD OF PRODUCING THE SAME

(71) Applicant: NGK INSULATORS, LTD., Nagoya (JP)

(72) Inventor: Ryohei Matsushita, Yokkaichi (JP)

(73) Assignee: NGK INSULATORS, LTD., Nagoya (JP)

( * ) Notice: Subject to any disclaimer, the term of this patent is extended or adjusted under 35 U.S.C. 154(b) by 401 days.

(21) Appl. No.: 17/156,974

(22) Filed: Jan. 25, 2021

(65) Prior Publication Data

US 2021/0329743 A1 Oct. 21, 2021

(30) Foreign Application Priority Data

Apr. 20, 2020 (JP) ................................ 2020-074791

(51) Int. Cl.
*H05B 3/06* (2006.01)
*H05B 3/14* (2006.01)

(52) U.S. Cl.
CPC .................................... *H05B 3/143* (2013.01)

(58) Field of Classification Search
CPC .......... H05B 3/143; H05B 3/283; H05B 3/02; H05B 3/20; H05B 3/265; H01L 21/67103; H01L 21/67248; H01L 21/68785; H01L 21/68792; H01L 21/683; H01L 21/68757
USPC ....................................................... 219/443.1
See application file for complete search history.

(56) References Cited

U.S. PATENT DOCUMENTS 8,790,007 B2 7/2014 Goto
10,453,712 B2 * 10/2019 Tsuchida ........... H01L 21/68785
2005/0016986 A1 * 1/2005 Ito ....................... C04B 35/6303 219/468.1
2005/0274325 A1 12/2005 Kuibira et al.
(Continued)

FOREIGN PATENT DOCUMENTS

JP 2009-009795 A 1/2009
JP 2010-109316 A 5/2010
(Continued)

OTHER PUBLICATIONS

Korean Office Action (Application No. 10-2021-0038405) dated Aug. 12, 2022 (with English translation).
(Continued)

*Primary Examiner* — Helena Kosanovic
*Assistant Examiner* — Tiffany T Tran
(74) *Attorney, Agent, or Firm* — BURR PATENT LAW, PLLC

(57) ABSTRACT

A ceramic heater includes a ceramic substrate, a resistance heater, a cylindrical shaft, a thermocouple path, and a thermocouple insertion hole. The disc-shaped ceramic substrate has a wafer placement surface at an upper surface. The resistance heater is embedded in the ceramic substrate. The cylindrical shaft supports the ceramic substrate from a lower surface of the ceramic substrate. The thermocouple path is provided between the resistance heater and the wafer placement surface and extends from a start position on a center side to an end position on an outer circumferential side inside the ceramic substrate. The thermocouple insertion hole is open at an inner shaft region of the lower surface of the ceramic substrate surrounded by the cylindrical shaft and communicates with the thermocouple path.

7 Claims, 9 Drawing Sheets

(56) References Cited

U.S. PATENT DOCUMENTS

| | | | | |
|---|---|---|---|---|
| 2009/0268779 | A1* | 10/2009 | Hotta | G01K 1/10 374/E7.004 |
| 2011/0005686 | A1* | 1/2011 | Tanaka | H01L 21/67248 156/345.52 |
| 2012/0211933 | A1* | 8/2012 | Goto | H01L 21/68757 269/293 |
| 2016/0002779 | A1* | 1/2016 | Lin | H01J 37/32724 118/500 |
| 2018/0308722 | A1 | 10/2018 | Umeki et al. | |
| 2021/0243848 | A1* | 8/2021 | Takahashi | H05B 3/283 |

FOREIGN PATENT DOCUMENTS

| | | | | |
|---|---|---|---|---|
| JP | 2012-080103 | A1 | 4/2012 | |
| JP | 5501467 | B2 | 5/2014 | |
| JP | 2018-073919 | A | 5/2018 | |
| KR | 10-2010-0127200 | A | 12/2010 | |
| KR | 10-2012-0060911 | A | 6/2012 | |
| KR | 10-2012-0112661 | A | 10/2012 | |
| KR | 10-2016-0004201 | A | 1/2016 | |
| KR | 10-2018-0117546 | A | 10/2018 | |
| KR | 10-2018-0136929 | A | 12/2018 | |
| TW | 200537968 | A | 11/2005 | |
| WO | WO-2011081049 | A1 * | 7/2011 | C23C 16/4586 |
| WO | 2012/039453 | A1 | 3/2012 | |

OTHER PUBLICATIONS

Japanese Office Action (Application No. 2020-074791) dated Nov. 22, 2022 (with English translation).

Taiwanese Office Action (Application No. 110102993) dated Aug. 30, 2021.

Korean Office Action (with English translation) dated Feb. 21, 2023 (Application No. 10-2021-0038405).

Korean Office Action (with English translation) dated May 19, 2023 (Application No. 10-2021-0038405).

* cited by examiner

[This Figure shows the thermocouple passage 27 in Figure 4 in its entirety.]

CERAMIC HEATER AND METHOD OF PRODUCING THE SAME

BACKGROUND OF THE INVENTION

1. Field of the Invention

The present invention relates to a ceramic heater and a method of producing the same.

2. Description of the Related Art

As a ceramic heater of related art, a so-called two-zone heater is known. In this two-zone heater, resistance heaters are independently embedded respectively on the inner circumferential side and the outer circumferential side of a disc-shaped ceramic substrate having a wafer placement surface. For example, in PTL 1, a ceramic heater 410 with a shaft illustrated in FIG. 9 is disclosed. The temperature of the outer circumferential side of a ceramic substrate 420 of the ceramic heater 410 with a shaft is measured by an outer circumferential thermocouple 450. A thermocouple guide 432 is a cylindrical member. The thermocouple guide 432 straightly extends from the lower side to the upper side in a straight shaft 440 and then is bent into an arc shape so as to be redirected by 90°. This thermocouple guide 432 is attached to a slit 427*a* provided in a region of a rear surface of the ceramic substrate 420 surrounded by the straight shaft 440. The slit 427*a* serves as an entrance portion of a thermocouple path 427. The outer circumferential thermocouple 450 is inserted into the cylinder of the thermocouple guide 432 and reaches an end position of the thermocouple path 427.

CITATION LIST

Patent Literature

PTL 1: JP 5501467 B

SUMMARY OF THE INVENTION

However, in the ceramic heater 410, a wafer placement surface 420*a* and the outer circumferential thermocouple 450 are separated from each other. For this reason, when the temperature is measured with a wafer placed, an actual temperature of the wafer and a measurement result of the temperature by using the outer circumferential thermocouple 450 are different from each other. Thus, the temperature of the wafer is not correctly measured by the outer circumferential thermocouple 450.

The present invention is made to solve such a problem and mainly aims to correctly measure the temperature of a wafer by a thermocouple.

A ceramic heater according to the present invention includes a ceramic substrate, a resistance heater, a cylindrical shaft, a thermocouple path, and a thermocouple insertion hole. The disc-shaped ceramic substrate has a wafer placement surface at an upper surface. The resistance heater is embedded in the ceramic substrate. The cylindrical shaft supports the ceramic substrate from a lower surface of the ceramic substrate. The thermocouple path is provided between the resistance heater and the wafer placement surface and extends from a start position on a center side to an end position on an outer circumferential side inside the ceramic substrate. The thermocouple insertion hole is open at an inner shaft region of the lower surface of the ceramic substrate surrounded by the cylindrical shaft and communicates with the thermocouple path.

In the ceramic heater according to the present invention, for measuring the temperature of a wafer with the thermocouple, the thermocouple is inserted through an opening of the thermocouple insertion hole into the thermocouple path provided between the resistance heater and the wafer placement surface. A temperature measurement portion (distal end) of the thermocouple is disposed at the end position on the outer circumferential side of the ceramic substrate. This end position exists between the resistance heater and the wafer placement surface. Accordingly, compared to the related art, the temperature measurement portion of the thermocouple is disposed close to the wafer. Thus, the temperature of the wafer can be correctly measured by the thermocouple.

In the ceramic heater according to the present invention, the ceramic substrate may include an upper plate having the wafer placement surface on an upper surface side and a lower plate in which the resistance heater is embedded and which is provided on a lower surface side of the upper plate. In this ceramic heater, the thermocouple path is formed by an upper plate groove provided in a lower surface of the upper plate and the lower plate that covers the upper plate groove, and the thermocouple insertion hole is provided so as to penetrate through the lower plate in a thickness direction. In this way, the lower plate is provided on the lower surface side of the upper plate with the upper plate groove and the thermocouple insertion hole aligned with each other. Thus, a ceramic heater in which the thermocouple can be inserted between the resistance heater and the wafer placement surface can be obtained. In this case, a width of the thermocouple insertion hole may be smaller than a width of a portion of the thermocouple path that communicates with the thermocouple insertion hole. In this way, when the upper plate and the lower plate are joined to each other, misalignment between the upper plate groove and the thermocouple insertion hole can be tolerated.

In the ceramic heater according to the present invention, the ceramic substrate may include an upper plate having the wafer placement surface on an upper surface side and a lower plate in which the resistance heater is embedded and which is provided on a lower surface side of the upper plate. In this ceramic heater, the thermocouple path is formed by a lower plate groove provided in an upper surface of the lower plate and the upper plate that covers the lower plate groove, and the thermocouple insertion hole is provided so as to communicate with the thermocouple path and penetrate through the lower plate in a thickness direction. In this way, the lower plate is provided on the lower surface side of the upper plate, and accordingly, a ceramic heater in which the thermocouple can be inserted between the resistance heater and the wafer placement surface can be easily obtained.

In the ceramic heater according to the present invention, the resistance heater may have a shape in which the resistance heater is wired from one of a pair of terminals provided in a central portion of the ceramic substrate so as to be folded back at a plurality of folds and then reach another of the pair of terminals. In this ceramic heater, the thermocouple insertion hole is provided by utilizing a heater non-existing region where the folds face each other. In this way, a processing area for providing the thermocouple insertion hole can be reliably allocated.

In the ceramic heater according to the present invention, the resistance heater may have a shape in which the resistance heater extends from one of a pair of terminals provided in a central portion of the ceramic substrate to an outer circumferential portion of the ceramic substrate, is wired in the outer circumferential portion, and then extends from the outer circumferential portion to reach another of the pair of terminals. In this ceramic heater, the thermocouple insertion hole is provided by utilizing a heater non-existing region where jumpers of the resistance heater that respectively extend from the pair of terminals to the outer circumferential portion face each other. In this way, a processing area for providing the thermocouple insertion hole can be reliably allocated.

Preferably, in the ceramic heater according to the present invention, a gap between the thermocouple insertion hole and the resistance heater and a gap between the thermocouple path and the resistance heater are greater than or equal to 3 mm. This facilitates maintaining of an insulation property between the thermocouple path and the resistance heater and the insulation property between the thermocouple insertion hole and the resistance heater.

The ceramic heater according to the present invention may include a thermocouple inserted into the thermocouple path. In this way, the temperature measurement portion of the thermocouple is disposed between the resistance heater and the wafer placement surface, and accordingly, the temperature of the wafer can be correctly measured by the thermocouple. In this case, the ceramic heater may include a thermocouple guide that is attached to the thermocouple insertion hole and that guides insertion of the thermocouple into the thermocouple path, and the thermocouple may be inserted into the thermocouple path by being guided by the thermocouple guide.

A first method of producing a ceramic heater according to the present invention includes the steps of (a) providing an upper plate groove from a start position on a center side to an end position on an outer circumferential side in a lower surface of an upper plate having a wafer placement surface on an upper surface side, (b) providing a thermocouple insertion hole that penetrates in a thickness direction through a lower plate in which a resistance heater is embedded, and (c) integrating the upper plate and the lower plate with each other such that the upper plate groove and the thermocouple insertion hole are aligned with each other.

In the first method of producing the ceramic heater, the upper plate and the lower plate are integrated with each other with the upper plate groove and the thermocouple insertion hole aligned with each other. Thus, a ceramic heater in which the thermocouple can be inserted between the resistance heater and the wafer placement surface can be produced. For example, “integrating” is performed by joining, bonding, compression, or the like.

In the first method of producing the ceramic heater according to the present invention, a width of the thermocouple insertion hole may be provided so as to be smaller than a width of the upper plate groove in the step (b). In this way, when the upper plate and the lower plate are integrated with each other, misalignment between the upper plate groove and the thermocouple insertion hole can be tolerated.

A second method of producing a ceramic heater according to the present invention includes the steps of (a) providing a lower plate groove from a start position on a center side to an end position in an outer circumferential portion in an upper surface of a lower plate in which a resistance heater is embedded, (b) providing a thermocouple insertion hole that penetrates through the lower plate in a thickness direction so as to communicate with the lower plate groove, and (c) integrating with each other the upper surface of the lower plate and a lower surface of an upper plate having a wafer placement surface at an upper surface.

In the second method of producing the ceramic heater according to the present invention, the upper plate and the lower plate are integrated with each other. Thus, a ceramic heater in which the thermocouple can be inserted between the resistance heater and the wafer placement surface can be produced.

DETAILED DESCRIPTION OF THE INVENTION

Figure 1:
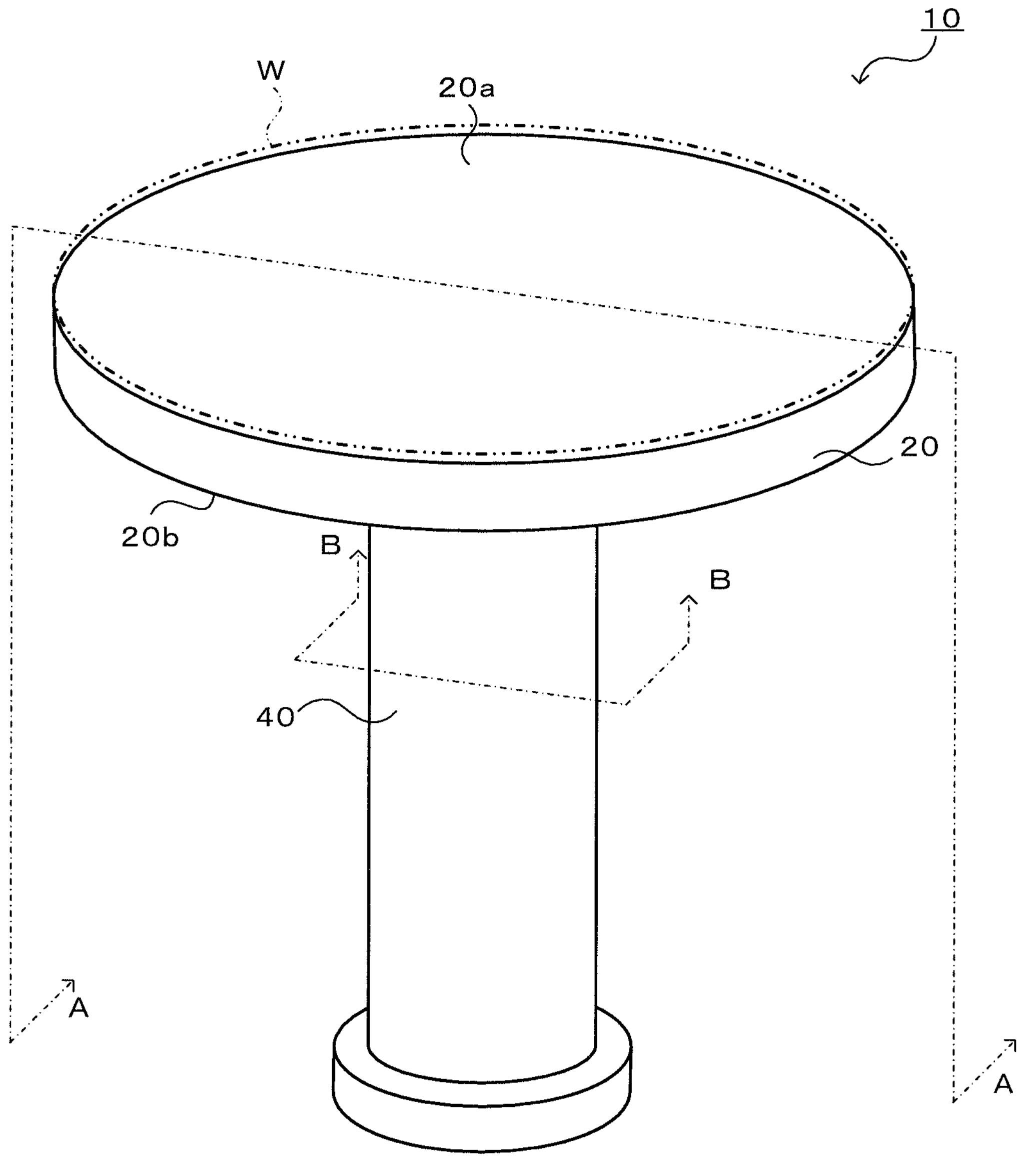
FIG. 1 is a perspective view of a ceramic heater 10.
Figure 2:
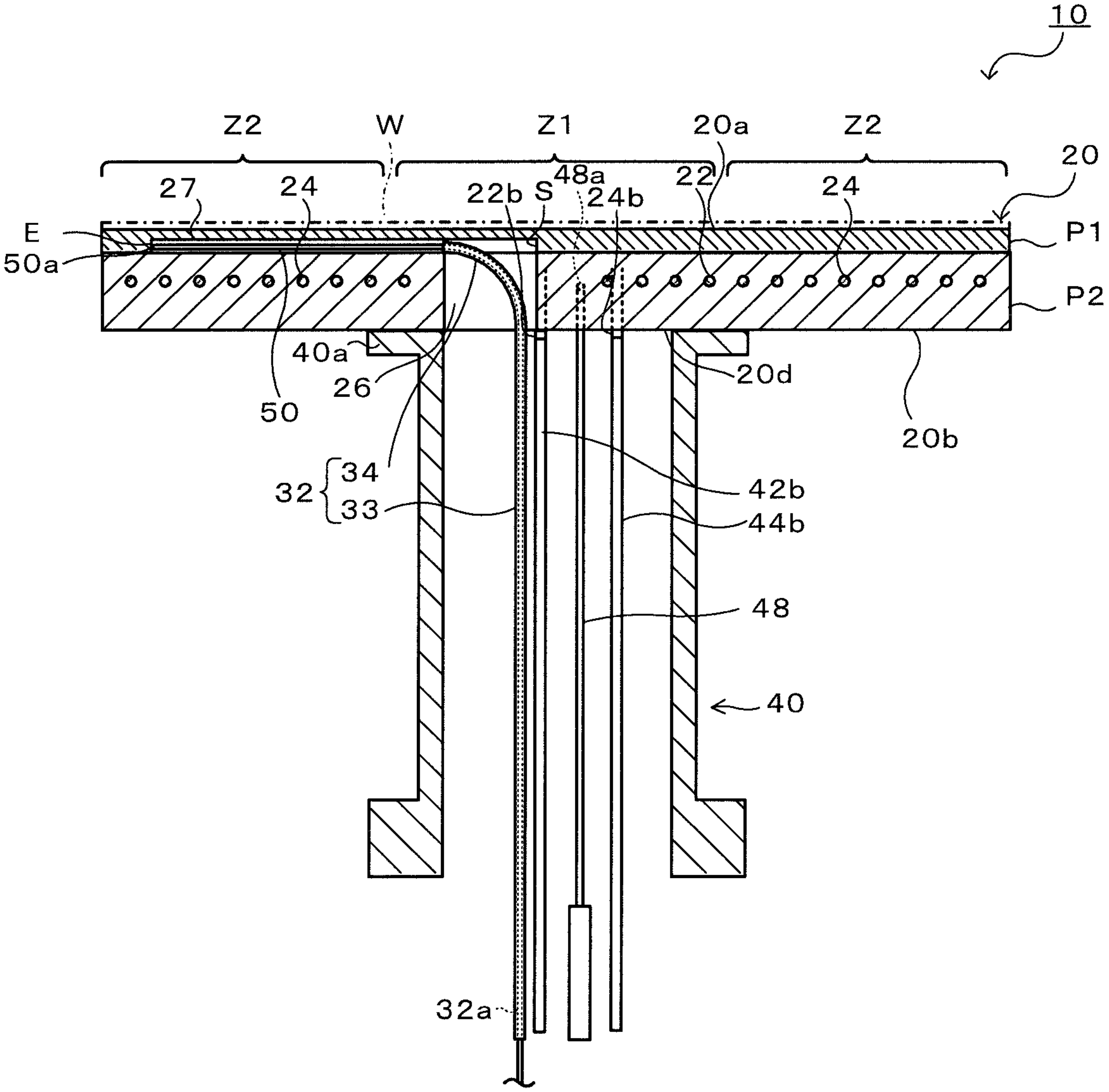
FIG. 2 is a sectional view taken along line A-A of FIG. 1.
Figure 3:
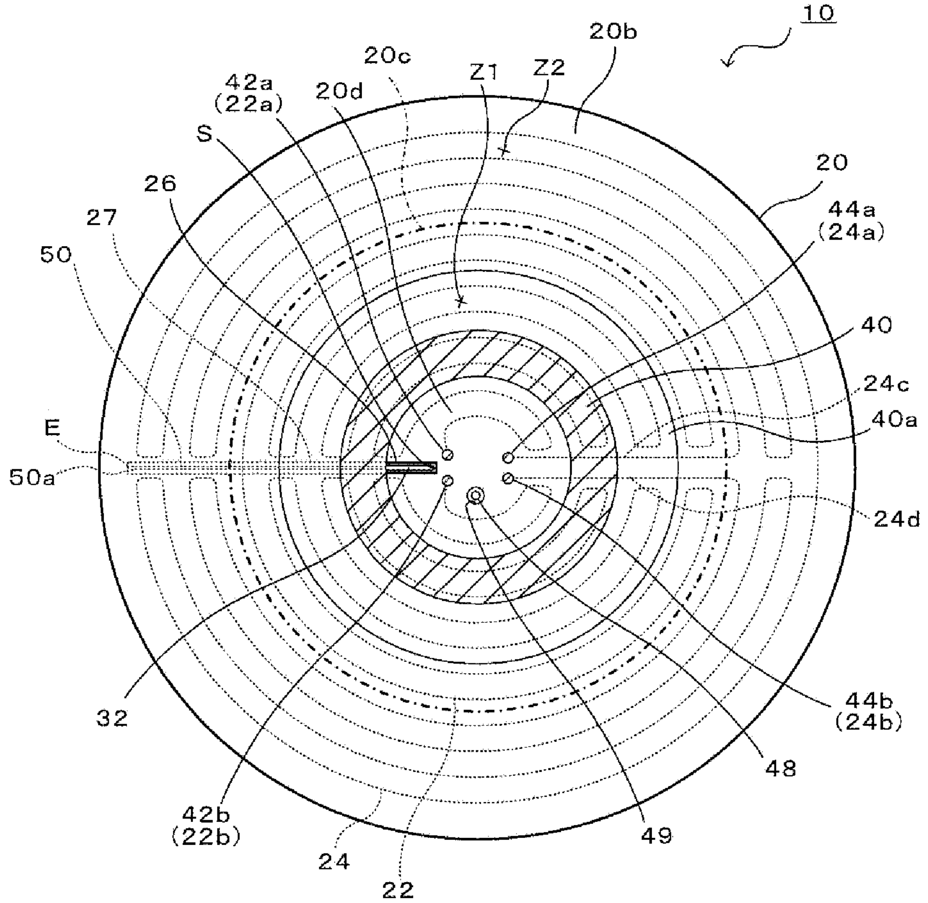
FIG. 3 is a sectional view taken along line B-B of FIG. 1.

An embodiment of the present invention is described below with reference to the drawings. FIG. 1 is a perspective view of a ceramic heater 10. FIG. 2 is a sectional view taken along line A-A of FIG. 1. FIG. 3 is a sectional view taken along line B-B of FIG. 1. Herein, “upper” and “lower” do not represent absolute positional relationships. These represent relative positional relationships. Accordingly, “upper” and “lower” may be changed to “left” and “right” or “front” and “rear” depending on the orientation of the ceramic heater.

The ceramic heater 10 is used to heat a wafer W on which processing such as etching or chemical-vapor deposition (CVD) is performed and installed in a vacuum chamber (not illustrated). The ceramic heater 10 includes a disc-shaped ceramic substrate 20 and a cylindrical shaft 40. The ceramic substrate 20 has a wafer placement surface 20*a*. The cylindrical shaft 40 is joined to a surface 20*b* (lower surface) of the ceramic substrate 20 opposite the wafer placement surface 20*a*.

The ceramic substrate 20 is a disc-shaped plate formed of a ceramic material represented by aluminum nitride or alumina. The diameter of the ceramic substrate 20 is not particularly limited. For example, the diameter is about 300 mm. The ceramic substrate 20 is separated into an inner circumferential zone Z1 having a small circular shape and an outer circumferential zone Z2 having an annular shape by a coaxial virtual boundary 20*c* (see FIG. 3). An inner circumferential resistance heater 22 is embedded in the inner circumferential zone Z1 of the ceramic substrate 20. An outer circumferential resistance heater 24 is embedded in the outer circumferential zone Z2 of the ceramic substrate 20. The resistance heaters 22, 24 include coils mainly formed of a material such as molybdenum, tungsten, or tungsten carbide. As illustrated in FIG. 2, the ceramic substrate 20 is fabricated by surface joining an upper plate P1 and a lower plate P2. The details of this point are to be described later.

As is the case with the ceramic substrate 20, the cylindrical shaft 40 is formed of ceramics such as aluminum nitride or alumina. The cylindrical shaft 40 is joined by diffusion bonding to the ceramic substrate 20 at a flange portion 40*a* disposed at an upper end of the cylindrical shaft 40.

As illustrated in FIG. 3, the inner circumferential resistance heater 22 is formed such that, starting from one of a pair of terminals 22*a*, 22*b*, the inner circumferential resistance heater 22 is folded back at a plurality of folds in a one-stroke pattern so as to be wired in a substantially entire region of the inner circumferential zone Z1, and then, reaches the other of the pair of terminals 22*a*, 22*b*. The pair of terminals 22*a*, 22*b* are provided in an inner shaft region 20*d* (a region of the lower surface 20*b* of the ceramic substrate 20 inside the cylindrical shaft 40). Power feed rods 42*a*, 42*b* formed of metal (for example, formed of Ni) are joined to the pair of terminals 22*a*, 22*b*, respectively.

As illustrated in FIG. 3, the outer circumferential resistance heater 24 is formed such that the outer circumferential resistance heater 24 extends from one of a pair of terminals 24*a*, 24*b* toward the outer circumferential zone Z2 of the ceramic substrate 20, folded back at a plurality of folds in a one-stroke pattern so as to be wired in a substantially entire region of the outer circumferential zone Z2, and then, extends from the outer circumferential zone Z2 to reach the other of the pair of terminals 24*a*, 24*b*. The pair of terminals 24*a*, 24*b* are provided in the inner shaft region 20*d* of the lower surface 20*b* of the ceramic substrate 20. Power feed rods 44*a*, 44*b* formed of metal (for example, formed of Ni) are joined to the pair of terminals 24*a*, 24*b*, respectively. Parts of the outer circumferential resistance heater 24 that respectively extend from the pair of terminals 24*a*, 24*b* to the outer circumferential zone Z2 are referred to as jumpers 24*c*, 24*d*.

Figure 4:
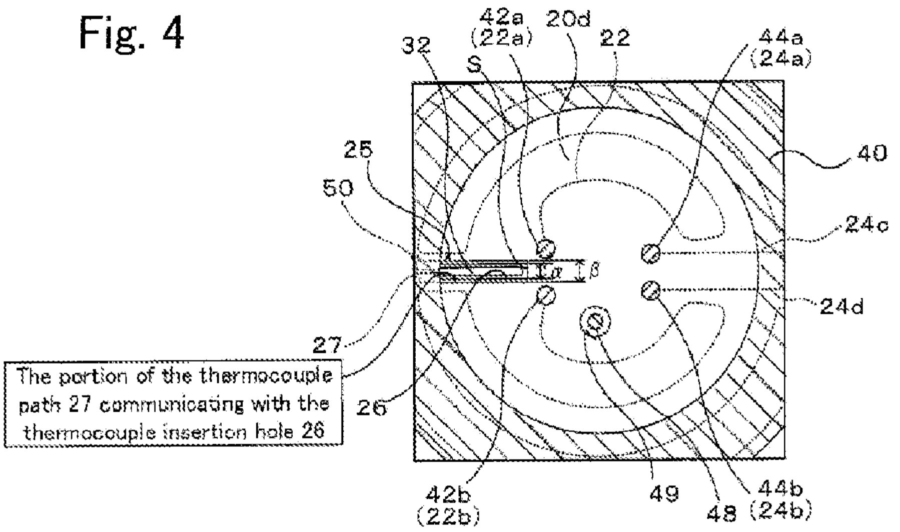
FIG. 4 is an enlarged view of part of FIG. 3.

As illustrated in FIG. 2, the ceramic substrate 20 has thereinside a thermocouple path 27 having an elongated hole shape for insertion of an outer circumferential thermocouple 50. The thermocouple path 27 is provided between the wafer placement surface 20*a* and the resistance heaters 22, 24 so as to be parallel to the wafer placement surface 20*a*. The thermocouple path 27 linearly extends from a start position S at or near the center inside the ceramic substrate 20 toward an end position E at an outer circumferential portion of the ceramic substrate 20. A thermocouple insertion hole 26 is formed in a portion of the ceramic substrate 20 from the inner shaft region 20*d* to the thermocouple path 27. The thermocouple insertion hole 26 has an elongated groove shape and allows a distal end of a curved portion 34 of a thermocouple guide 32 to be fitted thereinto. The thermocouple insertion hole 26 is open at the inner shaft region 20*d*. As illustrated in FIGS. 2 to 4, the thermocouple insertion hole 26 is provided by utilizing a heater non-existing region 25 of the ceramic substrate 20 where the folds of the inner circumferential resistance heater 22 face each other so as to extend from a position at or near the center toward the outer circumferential side of the inner shaft region 20*d* and the wafer placement surface 20*a* and communicate with the thermocouple path 27 disposed between the inner circumferential resistance heater 22 and the wafer placement surface 20*a*. A width α of the thermocouple insertion hole 26 is formed so as to be smaller than a width β of a portion of the thermocouple path 27 communicating with the thermocouple insertion hole 26 (see FIG. 4). Preferably, gaps between the thermocouple insertion hole 26 and the resistance heaters 22, 24 and gaps between the thermocouple path 27 and the resistance heaters 22, 24 are greater than or equal to 3 mm for maintaining an insulation property.

As illustrated in FIG. 2, the thermocouple guide 32 is a cylindrical member that has a guide hole 32*a* and is formed of metal (for example, formed of stainless steel). The thermocouple guide 32 has a perpendicular portion 33 that extends in a vertical direction relative to the wafer placement surface 20*a* and the curved portion 34 where the thermocouple guide 32 is redirected from the vertical direction to the horizontal direction. The radius of curvature of the curved portion 34 is not particularly limited. For example, the radius of curvature is about 20 to 40 mm. The outer circumferential thermocouple 50 is inserted through the guide hole 32*a* of the thermocouple guide 32. The distal end of the curved portion 34 may be simply fitted into the thermocouple insertion hole 26. Alternatively, the distal end of the curved portion 34 may be joined or bonded to the inside of the thermocouple insertion hole 26.

As illustrated in FIGS. 2 to 4, in addition to the thermocouple guide 32, the power feed rods 42*a*, 42*b* respectively connected to the pair of terminals 22*a*, 22*b* of the inner circumferential resistance heater 22 and the power feed rods 44*a*, 44*b* respectively connected to the pair of the terminals 24*a*, 24*b* of the outer circumferential resistance heater 24 are disposed inside the cylindrical shaft 40. Furthermore, an inner circumferential thermocouple 48 for measurement of the temperature near the center of the ceramic substrate 20 and the outer circumferential thermocouple 50 for measurement of the temperature near the outer circumference of the ceramic substrate 20 are disposed inside the cylindrical shaft 40. The inner circumferential thermocouple 48 is inserted into a recess 49 provided in the inner shaft region 20*d* of the ceramic substrate 20. A temperature measurement portion 48*a* disposed at a distal end of the inner circumferential thermocouple 48 is in contact with the ceramic substrate 20. The recess 49 is provided at a position of the lower surface 20*b* where the terminals 22*a*, 22*b*, 24*a*, 24*b* or the thermocouple insertion hole 26 is not provided. The outer circumferential thermocouple 50 is a sheathed thermocouple and disposed so as to pass through the guide hole 32*a* of the thermocouple guide 32 and the thermocouple path 27.

Figure 5A:
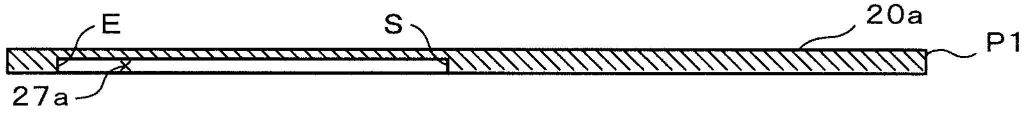
FIGS. 5A to 5C illustrate examples of a method of producing the ceramic heater 10.
Figure 5B:
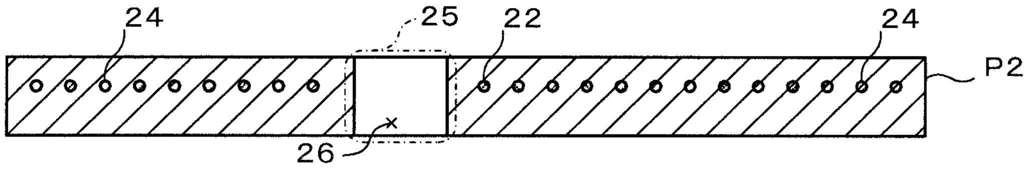
Figure 5C:
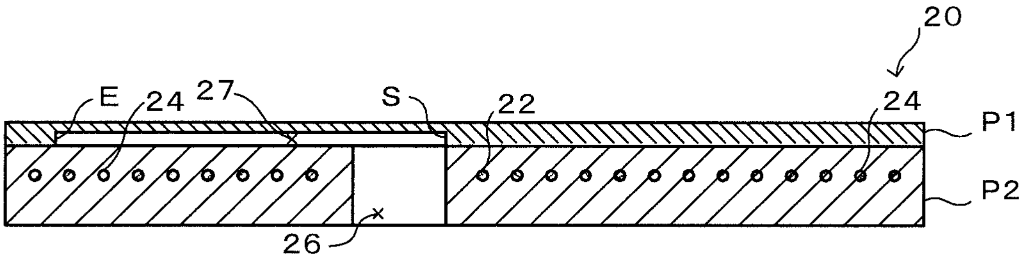

Next, an example of a method of producing the ceramic heater 10 is described. FIGS. 5A to 5C illustrate examples of the method of producing the ceramic heater 10.

First, the upper plate P1 and the lower plate P2 are fabricated. The upper plate P1 has the wafer placement surface 20*a* at its upper surface. The resistance heaters 22, 24 wired such that the resistance heaters 22, 24 are folded back at the plurality of folds are embedded in the lower plate P2. The upper plate P1 and the lower plate P2 can be obtained by, for example, fabricating ceramic molded bodies by mold casting, and firing the ceramic molded bodies. Here, the "mold casting" refers to the following method: a ceramic slurry containing ceramic material powder and a molding agent is poured into a mold; and the molding agent is caused to undergo chemical reaction in the mold so as to mold the ceramic slurry to obtain a molded body. For example, the molding agent may contain isocyanate and polyol and may be molded through urethane reaction. Next, as illustrated in FIG. 5A, an upper plate groove 27*a* is formed in the lower surface of the upper plate P1. Specifically, a groove linearly extending from the start position S at or near the center of the lower surface of the upper plate P1 to the end position E at an outer circumferential portion of the upper plate P1 is formed by cutting or blasting.

Next, as illustrated in FIG. 5B, the thermocouple insertion hole 26 is formed in the heater non-existing region 25 of the lower plate P2. Specifically, a through hole that penetrates through the lower plate P2 in the thickness direction is formed by cutting or blasting. The width α of the thermocouple insertion hole 26 in the lateral direction is made to be smaller than the width β of a portion of the upper plate groove 27*a* communicating with the thermocouple insertion hole 26.

Next, as illustrated in FIG. 5C, the upper plate P1 and the lower plate P2 are joined to each other to obtain the ceramic substrate 20. Specifically, the upper plate P1 and the lower plate P2 are superposed on each other such that, when seen from the wafer placement surface 20*a* side, the thermocouple insertion hole 26 is disposed inside the upper plate groove 27*a* and then joined to each other. Thus, the thermocouple path 27 is formed between the resistance heaters 22, 24 and the wafer placement surface 20*a* by the upper plate groove 27*a* and the lower plate P2 covering the upper plate groove 27*a*.

Next, the ceramic substrate 20 and the cylindrical shaft 40 are joined to each other. The cylindrical shaft 40 can be obtained by, for example, fabricating a ceramic molded body by mold casting, and firing the ceramic molded body. At last, through holes are provided at positions of the inner shaft region 20*d* corresponding to the terminals 22*a*, 22*b*, 24*a*, 24*b* so as to expose the terminals 22*a*, 22*b*, 24*a*, 24*b* in the inner shaft region 20*d*. Then, the terminals 22*a*, 22*b*, 24*a*, 24*b* and the power feed rods 42*a*, 42*b*, 44*a*, 44*b* are respectively joined to each other with a blazing alloy.

Next, an example of use of the ceramic heater 10 is described. First, the ceramic heater 10 is installed in the vacuum chamber (not illustrated), and the wafer W is placed on the wafer placement surface 20*a* of the ceramic heater 10. Then, the power supplied to the inner circumferential resistance heater 22 is adjusted so that the temperature detected by the inner circumferential thermocouple 48 agrees with a predetermined inner circumferential target temperature, and the power supplied to the outer circumferential resistance heater 24 is adjusted so that the temperature detected by the outer circumferential thermocouple 50 agrees with a predetermined outer circumferential target temperature. In this way, the temperature of the wafer W is controlled so as to agree with a desired temperature. Then, the inside of the vacuum chamber is set in a vacuum atmosphere or a pressure reduced atmosphere, plasma is generated in the vacuum chamber, and the generated plasma is utilized for, for example, causing the wafer W to undergo a CVD process or etching the wafer W.

In the ceramic heater 10 according to the present embodiment having been described, for measuring the temperature of the wafer W with the outer circumferential thermocouple 50, the outer circumferential thermocouple 50 is inserted through the opening of the thermocouple insertion hole 26 into the thermocouple path 27 provided between the resistance heaters 22, 24 and the wafer placement surface 20*a*. A temperature measurement portion 50*a* (distal end) of the outer circumferential thermocouple 50 is disposed at the end position E on the outer circumferential side of the ceramic substrate 20. This end position E exists between the resistance heaters 22, 24 and the wafer placement surface 20*a*. Accordingly, compared to the related art, the temperature measurement portion 50*a* of the outer circumferential thermocouple 50 is disposed close to the wafer W. Thus, the temperature of the wafer W can be correctly measured by the outer circumferential thermocouple 50.

Furthermore, in the ceramic heater 10, the lower plate P2 is provided on the lower surface side of the upper plate P1 with the upper plate groove 27*a* and the thermocouple insertion hole 26 aligned with each other. Thus, a ceramic heater in which the outer circumferential thermocouple 50 can be inserted between the resistance heaters 22, 24 and the wafer placement surface 20*a* can be obtained. Furthermore, the width α of the thermocouple insertion hole 26 is smaller than the width β of the portion of the thermocouple path 27 communicating with the thermocouple insertion hole 26. Thus, when the upper plate P1 and the lower plate P2 are joined to each other, misalignment between the upper plate groove 27*a* and the thermocouple insertion hole 26 can be tolerated. The width of the thermocouple path 27 positioned closer to the outer circumference than the portion of the thermocouple path 27 communicating with the thermocouple insertion hole 26 may be tapered toward the outer circumference. This can suppress meandering of the outer circumferential thermocouple 50.

Furthermore, in the ceramic heater 10, the thermocouple insertion hole 26 is provided by utilizing the heater non-existing region 25 of the ceramic substrate 20 where the folds of the inner circumferential resistance heater 22 face each other. Accordingly, a processing area for providing the thermocouple insertion hole 26 can be reliably allocated.

In the ceramic heater 10, the gaps between the thermocouple insertion hole 26 and the resistance heaters 22, 24 and the gaps between the thermocouple path 27 and the resistance heaters 22, 24 are greater than or equal to 3 mm. This facilitates maintaining of the insulation property between the thermocouple path 27 and the resistance heaters 22, 24 and the insulation properties between the thermocouple insertion hole 26 and the resistance heaters 22, 24.

Furthermore, the ceramic heater 10 includes the outer circumferential thermocouple 50 inserted into the thermocouple path 27. Thus, the temperature measurement portion 50*a* of the outer circumferential thermocouple 50 exists between the outer circumferential resistance heater 24 and the wafer placement surface 20*a*, and accordingly, the temperature of the outer circumference of the wafer W can be correctly measured by the outer circumferential thermocouple 50.

Furthermore, in the method of producing the ceramic heater 10 according to the present embodiment, the upper plate P1 and the lower plate P2 are joined to each other with the upper plate groove 27*a* and the thermocouple insertion hole 26 aligned with each other. Thus, a ceramic heater in which the outer circumferential thermocouple 50 can be inserted between the resistance heaters 22, 24 and the wafer placement surface 20*a* can be produced.

Furthermore, in step (b), the width of the thermocouple insertion hole 26 is made to be smaller than the width of the portion of the upper plate groove 27*a* communicating with the thermocouple insertion hole 26. Thus, when the upper plate P1 and the lower plate P2 are joined to each other, misalignment between the upper plate groove 27*a* and the thermocouple insertion hole 26 can be tolerated.

Of course, the present invention is not limited in any way to the above-described embodiment and can be embodied in various manners without departing from the technical scope of the present invention.

Figure 6A:
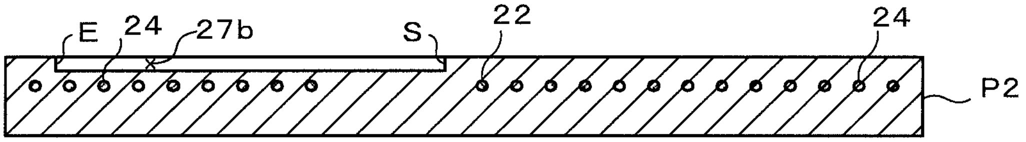
FIGS. 6A to 6C illustrate examples of a method of producing a ceramic heater 110.
Figure 6B:
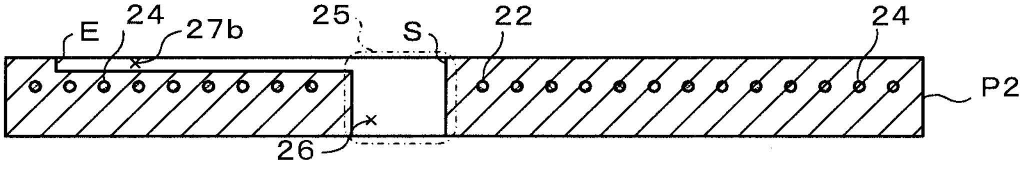
Figure 6C:
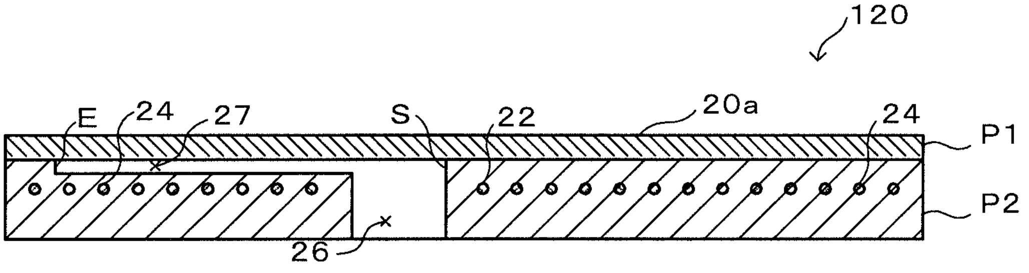
Figure 7:
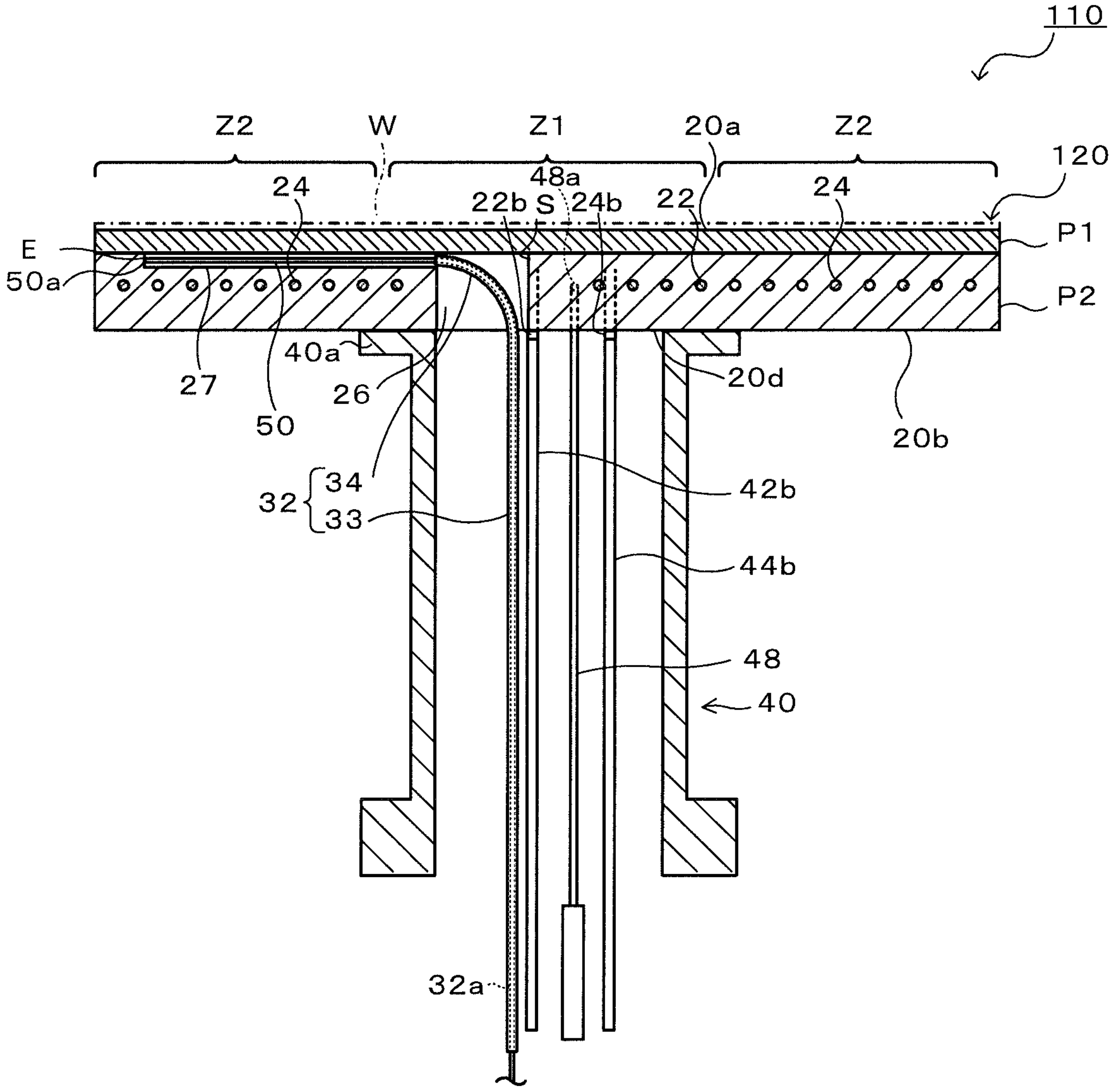
FIG. 7 is a sectional view of the ceramic heater 110.

According to the above-described embodiment, the ceramic heater 10 is fabricated by, for example, using the ceramic substrate 20 obtained by joining to each other the upper plate P1 provided with the upper plate groove 27*a* and the lower plate P2 provided with the thermocouple insertion hole 26. However, this is not limiting. For example, a method of producing a ceramic heater 110 illustrated in FIG. 7 is described below with reference to FIGS. 6A to 6C. The configuration of the ceramic heater 110 is similar to that of the ceramic heater 10 except for provision of a lower plate groove 27*b* in the lower plate P2 instead of provision of the upper plate groove 27*a* in the upper plate P1. First, the upper plate P1 and the lower plate P2 are fabricated. The upper plate P1 has the wafer placement surface 20*a* at the upper surface. The resistance heaters 22, 24 wired such that the resistance heaters 22, 24 are folded back at the plurality of folds are embedded in the lower plate P2. Next, as illustrated in FIG. 6A, the lower plate groove 27*b* is formed in an upper surface of the lower plate P2. Specifically, a groove linearly extending from the start position S at or near the center of the upper surface of the lower plate P2 to the end position E at the outer circumferential side of the lower plate P2 is formed by cutting or blasting. Next, as illustrated in FIG. 6B, the thermocouple insertion hole 26 is formed in the heater non-existing region 25. Specifically, a through hole that penetrates through the lower plate P2 in the thickness direction is formed so as to communicate with the lower plate groove 27*b* by cutting or blasting. Next, as illustrated in FIG. 6C, the upper plate P1 and the lower plate P2 are joined to each other to obtain a ceramic substrate 120. The ceramic substrate 120 obtained as described above may be used to fabricate the ceramic heater 110 illustrated in FIG. 7. Thus, the thermocouple path 27 is formed between the resistance heaters 22, 24 and the wafer placement surface 20*a* by the lower plate groove 27*b* and the upper plate P1 covering the lower plate groove 27*b*. In FIGS. 6A to 6C and 7, the same elements as those of the above-described embodiment are denoted by the same reference signs.

Figure 8:
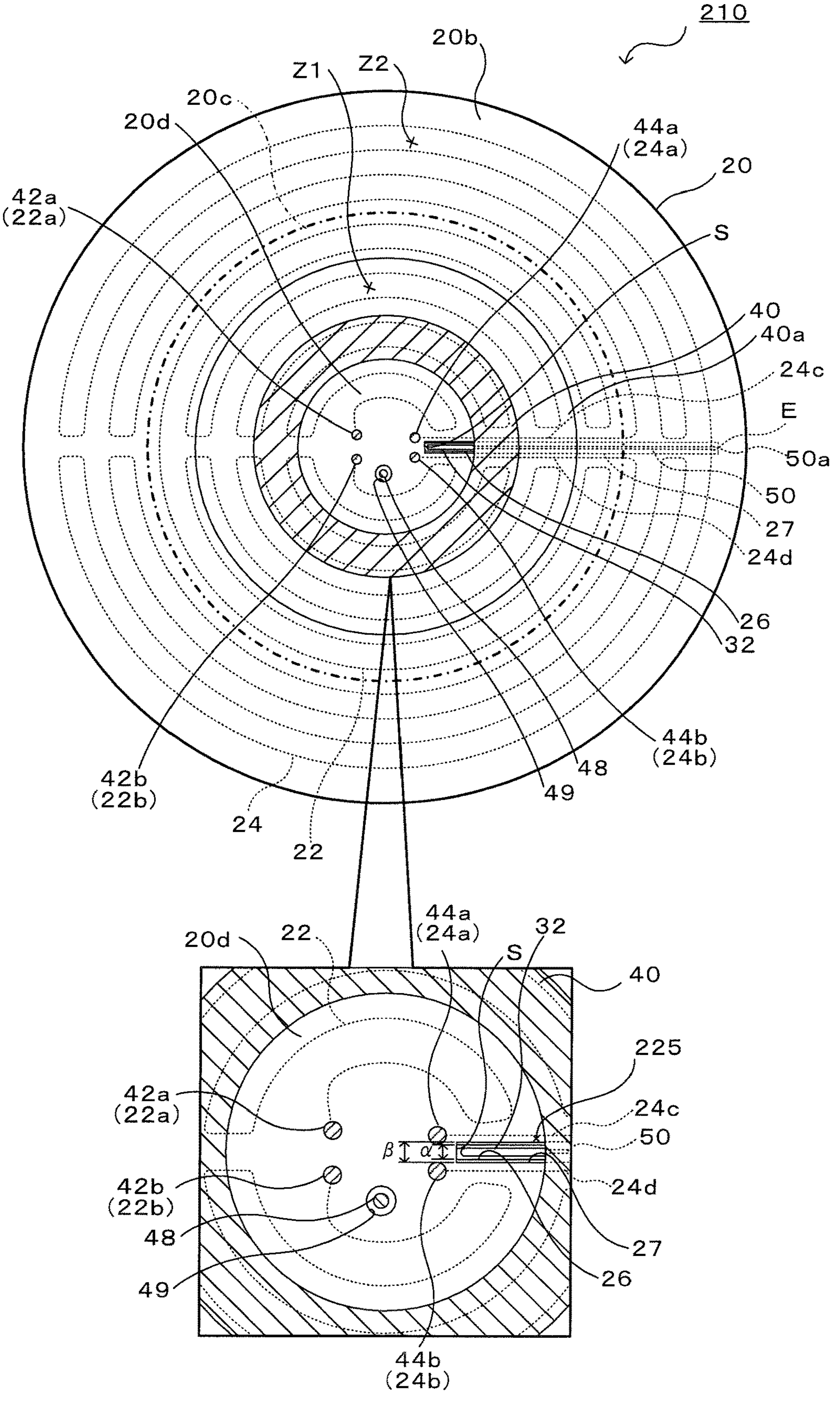
FIG. 8 is a sectional view of a ceramic heater 210.
Figure 9:
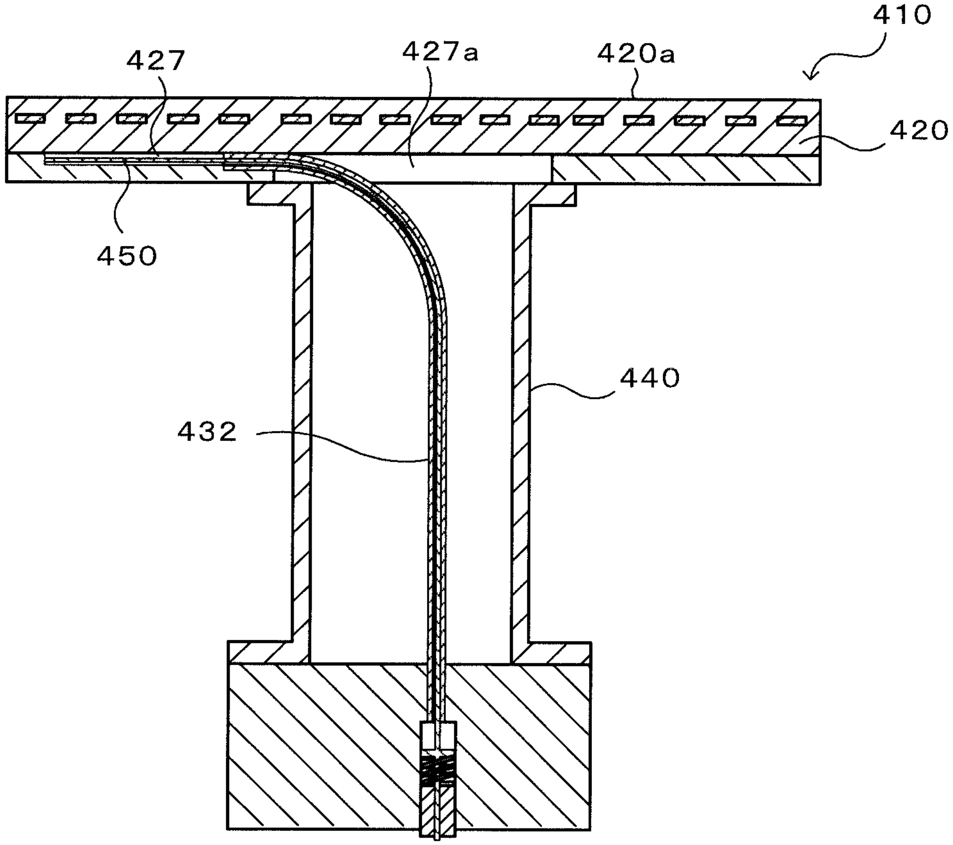
Fig. 9 Related Art
FIG. 9 is a sectional view of a ceramic heater 410.
Figure 10:
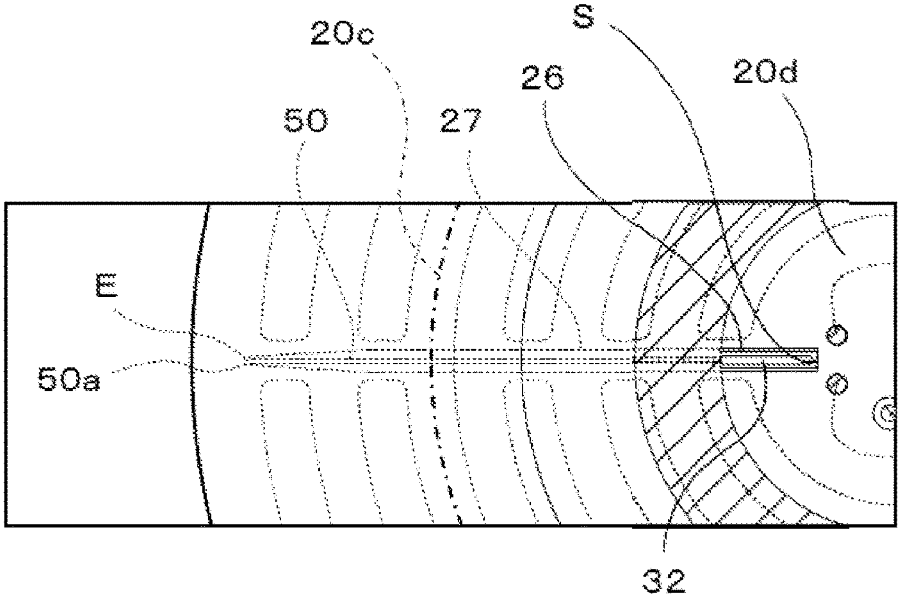
FIG. 10 is a partially enlarged sectional view of FIG. 4 of a variant that a width of the thermocouple path is tapered toward the outer circumference.

Although the thermocouple insertion hole 26 is provided by utilizing the heater non-existing region 25 where the folds of the inner circumferential resistance heater 22 face each other according to the above-described embodiment, this is not limiting. For example, as is the case with a ceramic heater 210 illustrated in FIG. 8, the thermocouple insertion hole 26 may be provided by utilizing a heater non-existing region 225. As illustrated in FIG. 8, the heater non-existing region 225 is a region where the jumper 24*c* that extends from the terminal 24*a* to the outer circumferential zone Z2 and the jumper 24*d* that extends from the terminal 24*b* to the outer circumferential zone Z2 face each other. Also in this way, the processing area for providing the thermocouple insertion hole 26 can be reliably allocated. In FIG. 8, the same elements as those of the above-described embodiment are denoted by the same reference signs.

Although the ceramic heater 10 is fabricated by joining the upper plate P1 and the lower plate P2 to each other according to the above-described embodiment, this is not limiting. For example, an unfired upper plate molded body and an unfired lower plate molded body may be fabricated, processed, and then, finally integrated with each other and fired.

Although the resistance heaters 22, 24 have a coil shape according to the above-described embodiment, this is not limiting. For example, the shape of the resistance heaters 22, 24 may be a ribbon shape or a mesh shape.

In the above-described embodiment, electrostatic electrode(s) or a radio frequency (RF) electrode may be incorporated in the ceramic substrate 20 or electrostatic electrode (s) and an RF electrode may be incorporated in the ceramic substrate 20 in addition to the resistance heaters 22, 24. When the electrostatic electrode(s) are incorporated, the wafer W can be attracted to and held by applying a voltage to the electrostatic electrode(s). When the RF electrode is incorporated, plasma can be generated by applying a high-frequency voltage between the RF electrode and a parallel planar electrode (not illustrated) disposed above the wafer placement surface 20*a*.

The present application claims priority from Japanese Patent Application No. 2020-074791, filed on Apr. 20, 2020, the entire contents of which are incorporated herein by reference.

What is claimed is:

1. A ceramic heater comprising:

a disc-shaped ceramic substrate having a wafer placement surface at an upper surface;

a resistance heater embedded in the ceramic substrate;

a cylindrical shaft that supports the ceramic substrate from a lower surface of the ceramic substrate;

a thermocouple path that is provided between the resistance heater and the wafer placement surface and that extends from a start position on a center side to an end position on an outer circumferential side inside the ceramic substrate; and a thermocouple insertion hole that is open at an inner shaft region of the lower surface of the ceramic substrate surrounded by the cylindrical shaft and that communicates with the thermocouple path;

wherein the ceramic substrate includes an upper plate having the wafer placement surface on an upper surface side, and a lower plate in which the resistance heater is embedded and which is provided on a lower surface side of the upper plate, wherein the thermocouple path is formed by an upper plate groove provided in a lower surface of the upper plate and the lower plate that covers the upper plate groove, and wherein the thermocouple insertion hole is provided so as to penetrate through the lower plate in a thickness direction;

wherein a width of the thermocouple insertion hole is smaller than a width of a portion of the thermocouple path communicating with the thermocouple insertion hole, and a width of the thermocouple path positioned closer to an outer circumference of the ceramic substrate than the portion of the thermocouple path communicating with the thermocouple insertion hole is tapered toward the outer circumference; and wherein the resistance heater has a shape in which the resistance heater extends from one of a first pair of terminals provided in a central portion of the ceramic substrate to an outer circumferential portion of the ceramic substrate, is wired in the outer circumferential portion, and then extends from the outer circumferential portion to reach another of the first pair of terminals, and wherein the ceramic substrate is separated into an inner circumferential zone having a small circular shape and an outer circumferential zone having an annular shape by a coaxial virtual boundary, the resistance heater includes an inner circumferential resistance heater embedded in the inner circumferential zone and an outer circumferential resistance heater embedded in the outer circumferential zone, the outer circumferential resistance heater includes a first jumper extending from one of a second pair of terminals provided in the central portion of the ceramic substrate to the outer circumferential zone and a second jumper extending from another of the second pair of terminals provided in the central portion of the ceramic substrate to the outer circumferential zone, the thermocouple insertion hole is provided by utilizing a heater non-existing region where the first jumper and the second jumper face each other.

2. The ceramic heater according to claim 1, wherein the resistance heater has a shape in which the resistance heater is wired from the one of the first pair of terminals provided in the central portion of the ceramic substrate so as to be folded back at a plurality of folds and then reach the another of the first pair of terminals provided in the central portion of the ceramic substrate, and wherein the thermocouple insertion hole is provided by utilizing the heater non-existing region where also the folds face each other.

3. The ceramic heater according to claim 1, wherein a gap between the thermocouple insertion hole and the resistance heater and a gap between the thermocouple path and the resistance heater are greater than or equal to 3 mm.

4. The ceramic heater according to claim 1, further comprising:

a thermocouple inserted into the thermocouple path.

5. The ceramic heater according to claim 4, further comprising:

a thermocouple guide that is attached to the thermocouple insertion hole and that guides insertion of the thermocouple into the thermocouple path, wherein the thermocouple is inserted into the thermocouple path by being guided by the thermocouple guide.

6. A method of producing a ceramic heater, the method comprising the steps of:

(a) providing an upper plate groove from a start position on a center side to an end position on an outer circumferential side in a lower surface of an upper plate having a wafer placement surface on an upper surface side;

(b) providing a thermocouple insertion hole that penetrates in a thickness direction through a lower plate in which a resistance heater is embedded; and (c) integrating the upper plate and the lower plate with each other such that the upper plate groove and the thermocouple insertion hole are aligned with each other to form a disc-shaped ceramic substrate;

wherein a thermocouple path is formed by the upper plate groove provided in the lower surface of the upper plate and the lower plate that covers the upper plate groove;

wherein a width of the thermocouple insertion hole is smaller than a width of a portion of the thermocouple path communicating with the thermocouple insertion hole, and a width of the thermocouple path positioned closer to an outer circumference of the ceramic substrate than the portion of the thermocouple path communicating with the thermocouple insertion hole is tapered toward the outer circumference; and wherein the resistance heater has a shape in which the resistance heater extends from one of a first pair of terminals provided in a central portion of the ceramic substrate to an outer circumferential portion of the ceramic substrate, is wired in the outer circumferential portion, and then extends from the outer circumferential portion to reach another of the first pair of terminals provided in the central portion of the ceramic substrate, and wherein the ceramic substrate is separated into an inner circumferential zone having a small circular shape and an outer circumferential zone having an annular shape by a coaxial virtual boundary, the resistance heater includes an inner circumferential resistance heater embedded in the inner circumferential zone and an outer circumferential resistance heater embedded in the outer circumferential zone, the outer circumferential resistance heater includes a first jumper extending from one of a second pair of terminals provided in the central portion of the ceramic substrate to the outer circumferential zone and a second jumper extending from another of the second pair of terminals provided in the central portion of the ceramic substrate to the outer circumferential zone, the thermocouple insertion hole is provided by utilizing a heater non-existing region where the first jumper and the second jumper face each other.

7. The method according to claim 6, wherein a width of the thermocouple insertion hole is provided so as to be smaller than a width of the upper plate groove in the step (b).

* * * * *